US010019685B1

(12) United States Patent
Ernst et al.

(10) Patent No.: US 10,019,685 B1
(45) Date of Patent: Jul. 10, 2018

(54) EMERGENCY DEPARTMENT INFORMATION SYSTEM

(71) Applicant: EPOWERdoc, Inc., Omaha, NE (US)

(72) Inventors: David C. Ernst, Vermilion, OH (US); Wes Grigsby, Omaha, NE (US); Edsel Pertile, Jacksonville, FL (US)

(73) Assignee: EPOWERdoc, Inc., Omaha, NE (US)

( * ) Notice: Subject to any disclaimer, the term of this patent is extended or adjusted under 35 U.S.C. 154(b) by 146 days.

(21) Appl. No.: 13/770,671

(22) Filed: Feb. 19, 2013

Related U.S. Application Data

(63) Continuation-in-part of application No. 13/040,738, filed on Mar. 4, 2011.

(Continued)

(51) Int. Cl.
*G06Q 50/00* (2012.01)
*G06Q 10/06* (2012.01)
(Continued)

(52) U.S. Cl.
CPC ......... *G06Q 10/0633* (2013.01); *G06Q 50/22* (2013.01); *G06F 17/243* (2013.01)

(58) Field of Classification Search
CPC ........ G06Q 50/22; G06Q 50/24; G06Q 40/08; G06Q 10/10; G06F 19/322; G06F 17/30; G06F 19/30; G06F 19/32; G06F 19/321; G06F 19/324; G06F 19/325; G06F 19/326; G06F 19/328; G06F 19/34; G06F 19/3418; G06F 19/3456; G06F 19/3462; G06F 19/3468; G06F 19/3475; G06F 19/3481; G06F 19/36; G16H 10/00; G16H 10/20; G16H 10/40; G16H 10/60; G16H 10/65; G16H 15/00; G16H 20/00; G16H 20/10; G16H 20/13; G16H 20/17; G16H 20/30; G16H 20/40; G16H 20/60; G16H 20/70; G16H 20/90; G16H 30/00; G16H 30/20; G16H 30/40; G16H 40/00; G16H 40/20; G16H 40/40; G16H 40/60; G16H 40/63; G16H 40/67; G16H 50/00; G16H 50/20; G16H 50/30; G16H 50/50; G16H 50/70; G16H 50/80; G16H 70/00; G16H 70/20;

(Continued)

(56) References Cited

U.S. PATENT DOCUMENTS 5,970,466 A * 10/1999 Detjen ............. G06Q 10/06314
705/2
6,529,876 B1 * 3/2003 Dart ....................... G06Q 10/10
705/2

(Continued)

*Primary Examiner* — Tran N Nguyen
(74) *Attorney, Agent, or Firm* — Suiter Swantz pc llo

(57) ABSTRACT

A method for documenting one or more patient encounters may include, but is not limited to: displaying a first user interface including a listing of patients assigned to one or more users; receiving a first user input; displaying a second user interface including a listing of patients assigned to a single user in response to the first user input; receiving a user selection of a first patient from the second user interface including the listing of patients assigned to the single user; and displaying a third user interface including a patient diagnosis and/or treatment record for the first patient in response to the user selection of the first patient from the second user interface including the listing of patients assigned to the single user.

15 Claims, 15 Drawing Sheets

Related U.S. Application Data

(60) Provisional application No. 61/368,284, filed on Jul. 28, 2010.

(51) Int. Cl.
*G06Q 50/22* (2018.01)
*G06Q 10/00* (2012.01)
*G06F 17/24* (2006.01)

(58) Field of Classification Search
CPC ........ G16H 70/40; G16H 70/60; G16H 80/00; A61N 1/08
USPC .......................................................... 705/2
See application file for complete search history.

(56) References Cited

U.S. PATENT DOCUMENTS

| | | | | |
|---|---|---|---|---|
| 2003/0011639 A1* | 1/2003 | Webb | ............... | G06F 3/0481 715/808 |
| 2004/0254814 A1* | 12/2004 | Paturu | ............... | G06F 19/327 705/2 |
| 2005/0075544 A1* | 4/2005 | Shapiro | ............... | G06F 19/322 600/300 |
| 2010/0036676 A1* | 2/2010 | Safdi | ............... | G06F 19/321 705/2 |

\* cited by examiner

EMERGENCY DEPARTMENT INFORMATION SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, or for any and all parent, grandparent, great-grandparent, etc. applications of the Related Application(s)).

RELATED APPLICATIONS

The present application claims priority to U.S. Provisional Patent Application Ser. No. 61/368,284 filed on Jul. 28, 2010 on behalf of Ernst et al. entitled "EMERGENCY DEPARTMENT INFORMATION SYSTEM" which is currently, or is an application of which a currently application is entitled to the benefit of the filing date.

The present application claims priority to U.S. patent application Ser. No. 13/040,738 filed on Mar. 4, 2011 on behalf of Ernst et al. entitled "EMERGENCY DEPARTMENT INFORMATION SYSTEM" which is currently, or is an application of which a currently application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

BACKGROUND

Patient care workflow in an Emergency Department (ED) is a unique and demanding environment that has been aided by the advent of Emergency Department Information Systems (EDIS). EDIS are computerized systems that may include functionality intended to assist in the documentation of patient care and management of workflow in an ED. The core features in most EDIS include nursing and physician documentation or Electronic Medical Records (EMRs), a Patient Management Tracking Board, Computerized Provider Order Entry (CPOE), Discharge Instructions, Electronic Prescription Writing, and Department Workflow Reporting.

However, prior EDIS systems have resulted in an industry average 20-30% increase in the time required for clinicians to provide patient care where they are installed. This creates inefficiency and safety risks for both the patient and clinician in the Emergency Department. The traditional core design of such EDIS systems' functionality and how individual patient records are accessed by the user within these systems may create workflow problems for clinicians in the ED.

Such problems may result from the employment of EDIS systems designed primarily from physicians' office, clinic and hospital inpatient environments. However, emergency medicine is a field unlike any other specialty in medicine today where the work environment is starkly unique from the physician's office, clinic, or hospital inpatient workflows. In these latter environments there is commonly a linear patient care workflow that starts with a registration clerk, then the nurse sees the patient, a physician consults with the patient, orders are given and carried out, test results are reviewed, and home-going instructions and prescriptions are rendered to the patient.

While the core approach to medical treatment in the physicians' office is similar to emergency medicine, the workflow by which such treatment is carried out is quite different. The average ED physician spends approximately ⅔ of their time managing more than three patients simultaneously while the average office-based physician may spend less than one minute per hour managing multiple patients (See Ann. Emerg. Med. 2001; 38920:146). An additional study showed that while managing multiple patients, ED physicians are interrupted and have to change their workflow an average of 10.2 times per hour while office-based physicians are interrupted only 3.9 times per hour (See Acad. Emerg. Med. 2000, 7(11): 1239) and 18.5% of the time the physician never returns to the original task (See Qual. and Saf. in Health Care 2010; 039255:1136).

Two distinct traditional design formats have been employed as foundations for developing an EDIS. The first is converting an EMR system designed generally for a physicians' office environment to function in the ED. The second is by using components or modules existing within an existing Hospital Information System (HIS), (e.g. the main Hospital patient management system), and combining them together to meet the required functionality demands of the ED.

Prior EDIS designs may center on a tracking board as a user homepage. All actions are initiated and centered on this screen, including managing the patients the user is responsible for and entering and exiting physician and nursing patient records. For HIS and physicians' office-based systems, this means entering and exiting multiple modules from the tracking board or opening and closing a chart from the tracking board each time a user needs to work on a new patient record.

As shown in FIG. 1, an EDIS system designed for a physicians' office environment may use a linear patient encounter as the core workflow design and require the user to perform multiple mouse clicks to return to a home page from a patient record in order to navigate to another patient. Multiple clicks are then required to open a new patient record, locate a section (e.g. physician or nurse chart), and then locate the desired specific information within that chart. This creates a state of continuous mouse clicking and/or scrolling for the user in order to migrate in and out of various patient records. This design functionality is seldom an issue in the office environment as this workflow is rarely interrupted, time is not as critical, and rarely is there more than one patient in the process at a time. However, repeating this process for navigating between each patient or accounting for each interruption during the period of a workday in the ED may become an exceedingly inefficient, frustrating, and unacceptable process for most physicians and nurses.

As shown in FIG. 2, a Hospital Information System (HIS)-based EDIS design may utilize available pre-existing "modules" within an HIS such as Nursing Documentation and CPOE from an Inpatient Health Record, Physician Documentation from an Ambulatory component, a Tracking Board from a Surgical component, and so on. These modules may then be combined together to form an EDIS. The workflow resulting from this design requires the user to enter and leave a separate module for each step in the care process and then locate the desired patient within the module each time they enter and leave the module.

The outcome is a fragmented patient record and a process necessitating multiple user inputs to move in and out of separate modules for every step in patient care requiring significant additional time as opposed to having a single "patient record" interface that contains all of the required functionality elements for that patient's care. For example, placing orders for a patient, documenting the physician history and reviewing lab results are all steps that would require multiple user inputs to enter and leave multiple modules, finding the patient within each module, and carrying out the desired task.

Additionally, most EDs have multiple users, including physicians and nurses, working simultaneously to care for a single patient. HIS and physicians' office-based EDIS design often allow only one user to modify a patient record at a time. Also, traditional EDIS Tracking Boards may show all of the patients currently in an ED and all of the users assigned to them at once on one home screen. In the case of an ED, there may be up to 75 or more patients visible at once on a large ED Tracking Board. Physicians and nurses may be assigned to 1-10 patients or more and migrating from one patient record to another, or even simply locating the patients the user is responsible for, frequently requires sorting through all of the other patients on the Tracking Board. This creates unnecessary and time consuming confusion or "noise" for the user in a busy work environment.

Further, EDIS systems may also require the user to electronically sign patient records at the end of an encounter and then "Lock" the record which converts it to a non-modifiable format that can be transferred to the record storage department for processing, billing, and storage. Failure of the user to complete these steps results in the patient record not being available for electronic storage or further processing with obvious workflow and financial ramifications. The ability for the user to remember these workflow steps and to carry them out in an organized and efficient fashion within the EDIS may present a challenge in the busy ED environment. For example, such activities may frequently have to be carried out after a work shift requiring the user to spend extra time in the system completing the process.

As such it may be desirable to provide an EDIS that includes functionality serving to overcome the above referenced traditional EDIS workflow design inefficiencies and patient safety issues to improve patient care times and create a safer environment for the clinician and patient without having to rely on the need for time-consuming traditional documentation methods (e.g. as dictation or paper templates.)

BRIEF DESCRIPTION OF THE DRAWINGS

The disclosure will become more fully understood from the following detailed description, taken in conjunction with the accompanying drawings, wherein like reference numerals refer to like elements, in which Figure Reference No:

FIG. 6 illustrates a graphical user interface of an EDIS including a patient record interface;

FIG. 8 illustrates a graphical user interface of an EDIS including a patient record interface for a first user;

FIG. 9 illustrates a graphical user interface of an EDIS including a patient record interface for a second user;

FIG. 10 illustrates a graphical user interface of an EDIS including a patient record interface;

FIG. 12 illustrates a graphical user interface of an EDIS including a patient record interface;

FIG. 14 illustrates a graphical user interface of an EDIS including a patient record interface.

DETAILED DESCRIPTION

Figure 1:
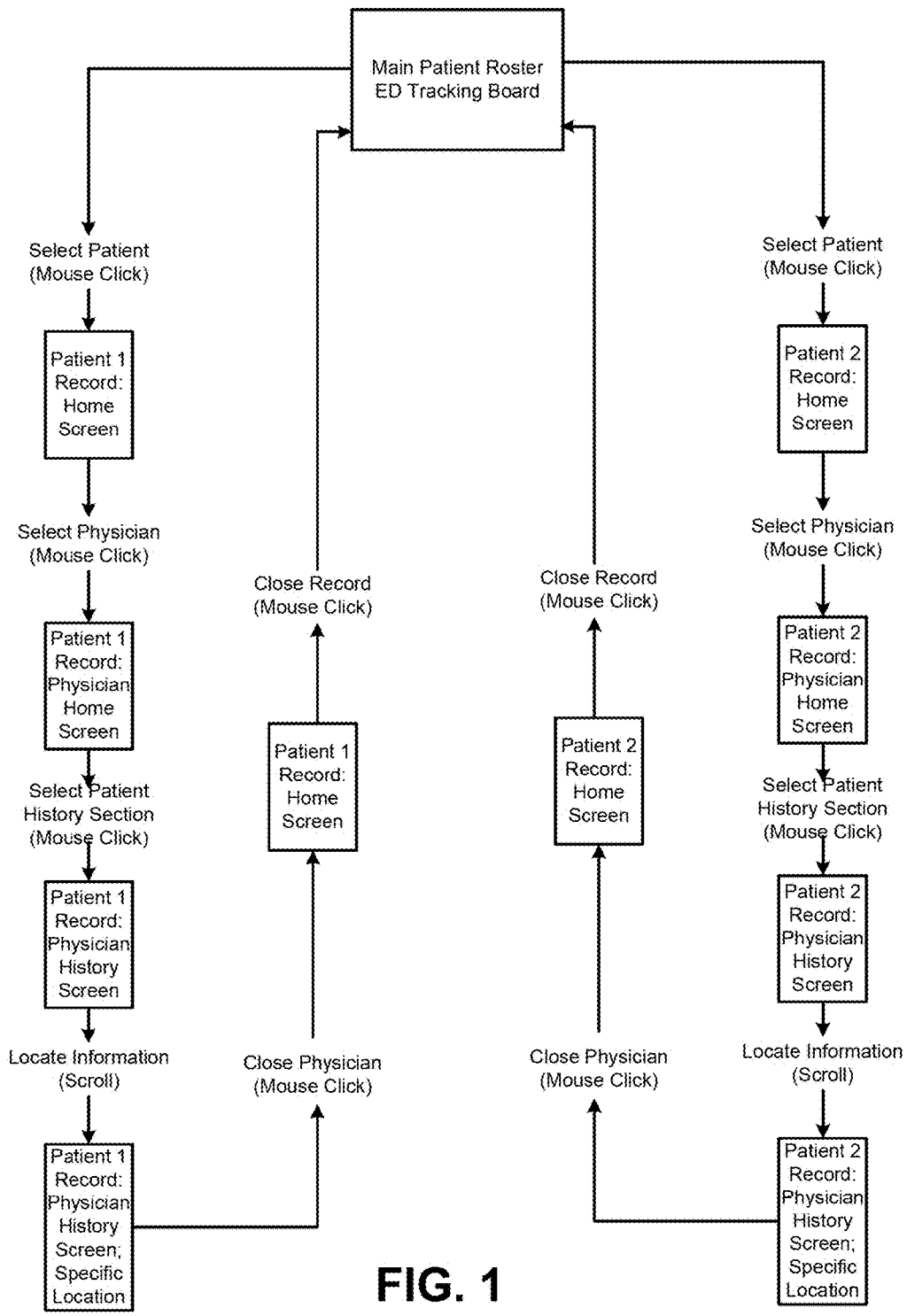
FIG. 1 illustrates a workflow diagram associated with an EDIS.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The combination of caring for multiple patients in the ED simultaneously (e.g. frequently 10 or more) with continuous interruptions creates a workflow state requiring the need for clinician users to constantly enter and leave patient records in various stages of completion in an EDIS. This requires the user to have to remember and search for these various stages of completion upon entering and leaving a patient record which is a very time consuming and potentially unsafe workflow that entails a multitude of continuous mouse clicks if the EDIS is designed around traditional doctor office workflow.

Figure 2:
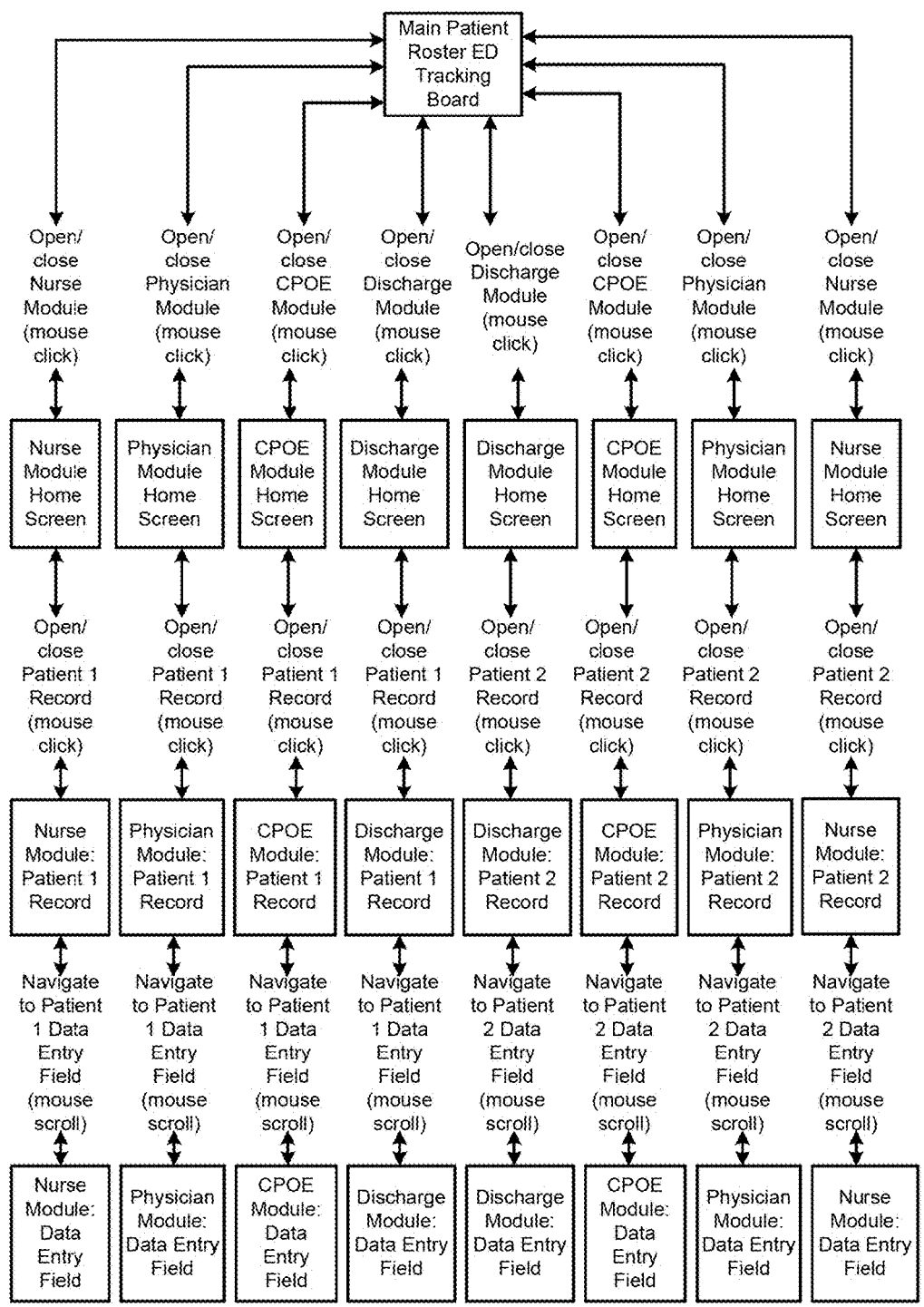
FIG. 2 illustrates a workflow diagram associated with an EDIS.

Returning to a location in a patent record where a user was previously working in a physicians' office-based EDIS requires returning to a main patient record screen, return to the tracking board, selecting a new patient, selecting the physician or nursing section, selecting the part of the section the user wishes to work on, and locating the point where the user left off within that section (e.g. See FIG. 1). This process may be repeated over and over for each patient care step. Similarly, returning to a location in a patient record where a user was previously working in an HIS-based EDIS requires returning to the tracking board, selecting a new module appropriate for that function (ie, CPOE for Orders), finding the patient within that module, completing the task, returning to the tracking board, locating another module to document that task, and so on (e.g. See FIG. 2).

As such, a novel EDIS as described herein may employ functionality that overcomes various workflow inefficiencies inherent in the designs of other EDIS systems.

For example, instead of treating an ED patient encounter as a series of smaller encounters within separate modules (e.g. as in the HIS design format) or as a linear encounter centered around having to enter and close a patient record from the tracking board for each work step (e.g. as in the physicians' office design), the EDIS 100 may create a complete record for each patient with all workflow functionality accessible from within that record, thereby eliminating a need to enter and leave separate "modules" or return to the tracking board at each step in patient care.

Figure 3:
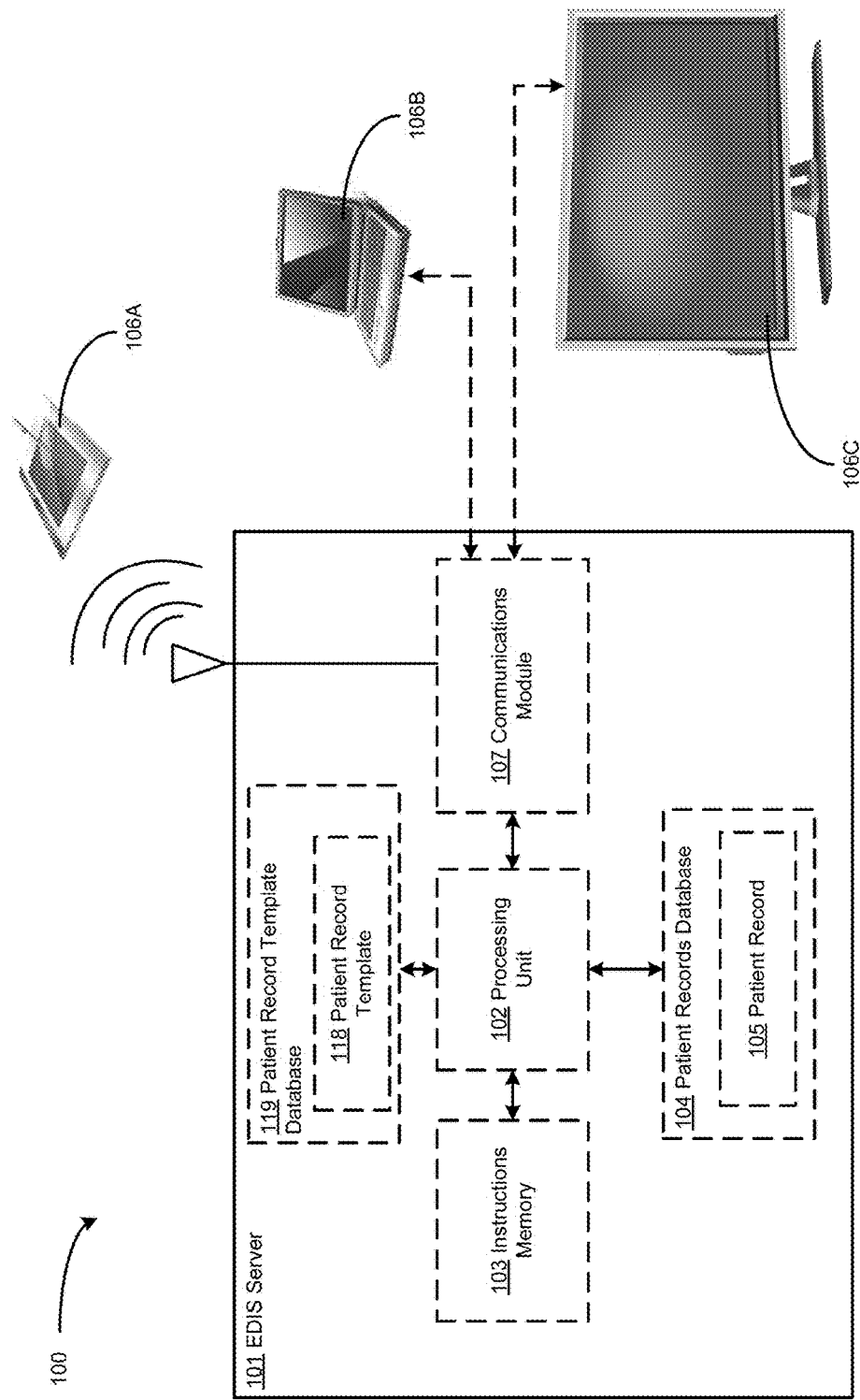
FIG. 3 illustrates an EDIS.

Referring to FIG. 3, an exemplary environment in which one or more technologies may be implemented is depicted. An EDIS 100 may include an EDIS server 101. The EDIS server 101 may include a processing unit 102 configured to carry out one or more operations. The processing unit 102 may be a general purpose computing device (e.g. a personal computer) executing at least one of software and firmware stored in an instruction memory 103 or an application-specific device (e.g. ASICs). The EDIS server 101 may further include a patient records database 104. The patient records database 104 may store patient records 105 including patient-specific data regarding medical care associated with that patient, as will be further described below.

The EDIS 100 may further include one or more user-interface nodes 106. For example, the user-interface node 106 may include a touch screen-type tablet computing device (e.g. user-interface node 106A) wirelessly coupled to the EDIS server 101, a workstation-type computing device (e.g. user-interface node 106B) hard-wired to the EDIS server 101, and or a display monitor e.g. user-interface node 106C).

The EDIS server 101 may communicate with the user-interface nodes 106 via an integrated communications module 107. The communications module 107 may include a transceiver configured to cooperatively communicate with one or more transceivers of the user-interface nodes 106 via various communication protocols (e.g. Wi-fi, Bluetooth, Ethernet, cellular data) to transmit and receive patient data between the user-interface nodes 106 and the EDIS server 101. For example, the processing unit 102 of the EDIS server 101 may retrieve one or more patient records from the patient records database 104 according to a user input received at one or more of the user-interface nodes 106. The communications module 107 of the EDIS server 101 may then transmit those records to the user-interface nodes 106 where they may be displayed to a user on a display panel associated with the user-interface nodes 106.

Although shown and described herein in the context of a client/server processing environment (e.g. a web server accessed by user-interface nodes 106) where the patient information is accessed, modified and stored within the EDIS server 101 of the EDIS 100 and served to the user-interface nodes 106, it is fully contemplated that the functionality described herein may be implemented in any number of processing environments (e.g. in an environment where the processing functionality for modification of patient information is implemented within the user-interface node 106 and then stored within the EDIS server 101).

As shown in FIGS. 4-6 and 8-14, the EDIS 100 may present a graphical user interface 108 configured to display and modify patient information stored as patient records 105 in the patient records database 104 according to user inputs at a user-interface node 106.

Referring to FIGS. 4-6, 8-10 and 12-14, the graphical user interface 108 may include a real-time patient status interface 109 configured in a header of the graphical user interface 108. The patient status interface 109 may provide a user with real time feedback on patient flow within the ED including the total number of patients in the department, the number in the "Waiting Room", how many patients need "To Be Seen" by a clinician, and how many are "Waiting Admission." This ability to monitor patient flow adds to more efficient utilization of resources and shortened patient time in the ED.

Figure 4:
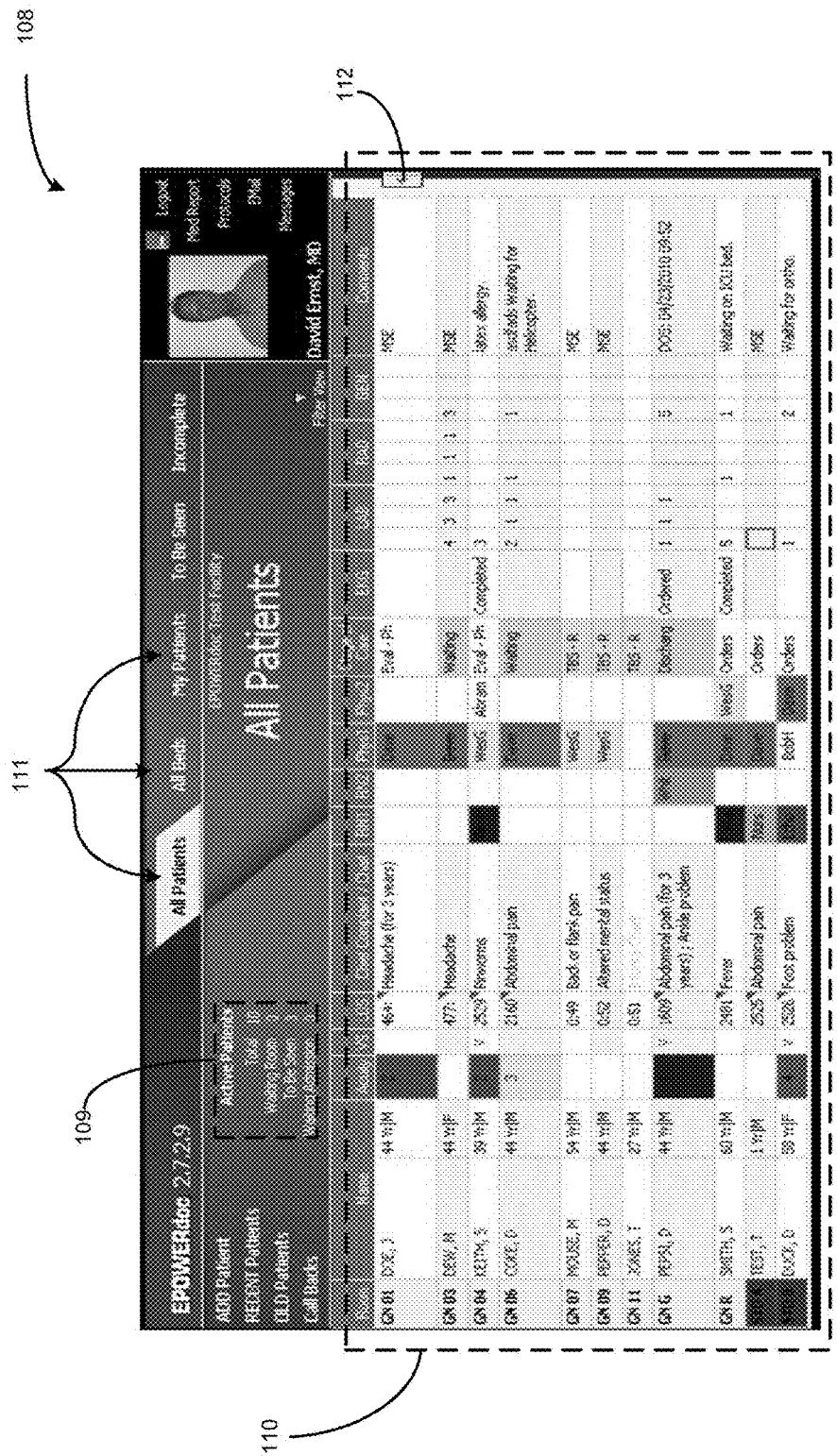
FIG. 4 illustrates a graphical user interface of an EDIS including a patient tracking board interface.

Referring to FIG. 4, the graphical user interface 108 may include a tracking board interface 110. The tracking board interface 110 may provide a high-level summary of the status of patients in the ED who are assigned to multiple users (e.g. patients for multiple physicians may be displayed on the same tracking board interface 110). The tracking board interface 110 may display one or more of a patient's name, room number, age, acuity of a patient's condition, chief complaint, attending nurse, attending physician, stage of care, orders and other comments. The view provided by the tracking board interface 110 may be configured according one or more user inputs. The tracking board interface 110 may include one or more tabbed links 111 allowing for alternate views of the tracking board according to user selections of links 111. For example, the tracking board interface 110 may be configured to display all patients currently in the ED, all the physical beds within the ED (e.g. those with and without assigned patients), patients associated with a particular attending physician and/or nurse, patients remaining to be seen, and the like.

The tracking board interface 110 may also be specifically configured for a particular logged-in user (e.g. a nursing staff user and/or a physician user). This includes the display of differing columns of patient information for different user types. For example, a generic tracking board view displayed on a large nursing station monitor (e.g. user-interface node 106C of FIG. 3) may have a comprehensive view of all patient beds while user-specific tracking board views (e.g. those on user-interface node 106A and user-interface node 106B of FIG. 3) may be customized to the user (e.g. nurse or physician) currently using those nodes. This allows the creation of a unique display that only shows the information relevant to that user and removes the clutter of unnecessary data that produces the potential for confusion and disorganization.

As referenced above, it may be the case that an ED may have a large number of current patients being tracked by the EDIS 100 making navigation to specific patients via the tracking board interface 110 inefficient. As such the graphical user interface 108 may include one or more additional interfaces which facilitate navigation between patient records as well as the modification of data within those patient records.

Figure 5:
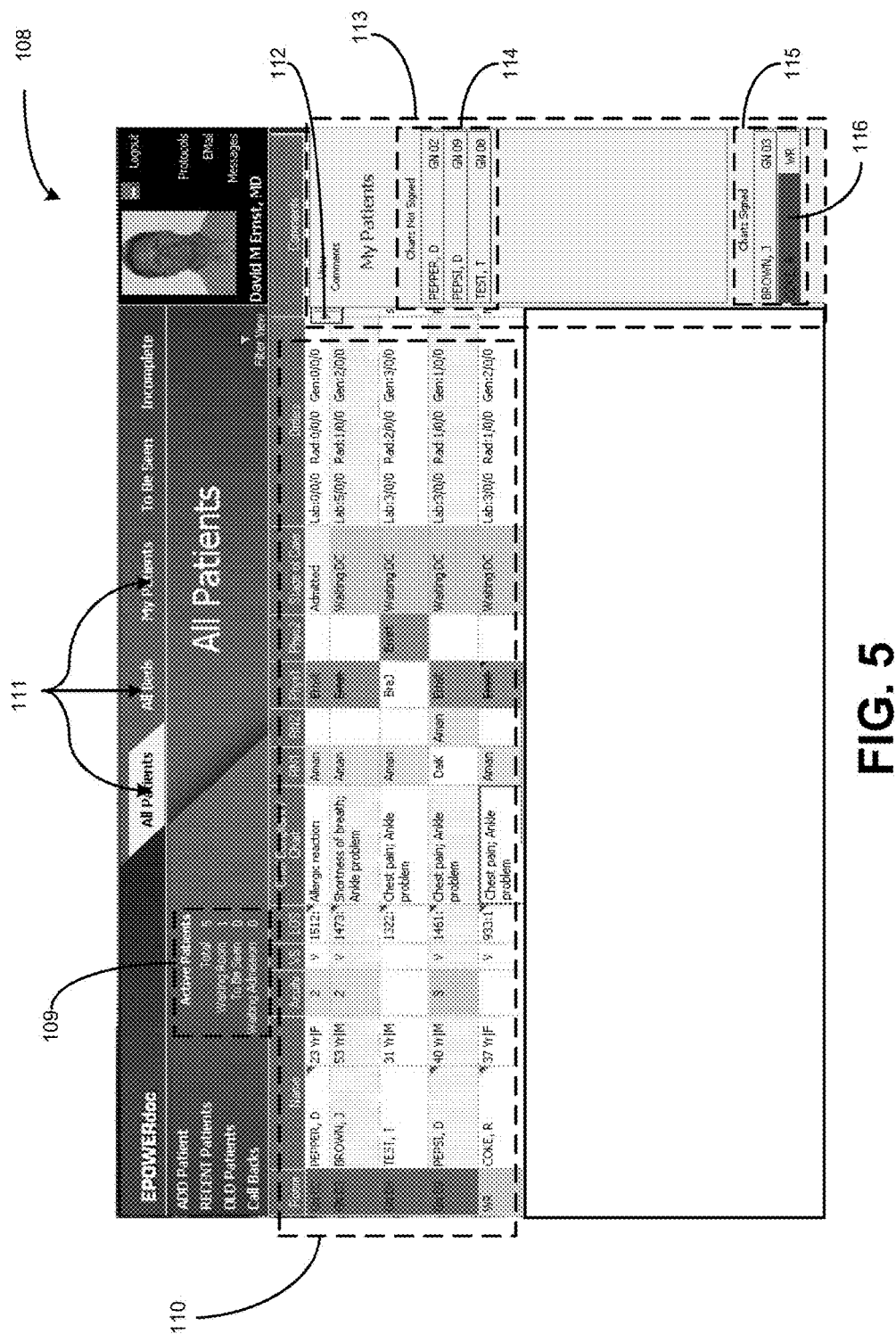
FIG. 5 illustrates a graphical user interface of an EDIS including a slide out interface.
Figure 6:
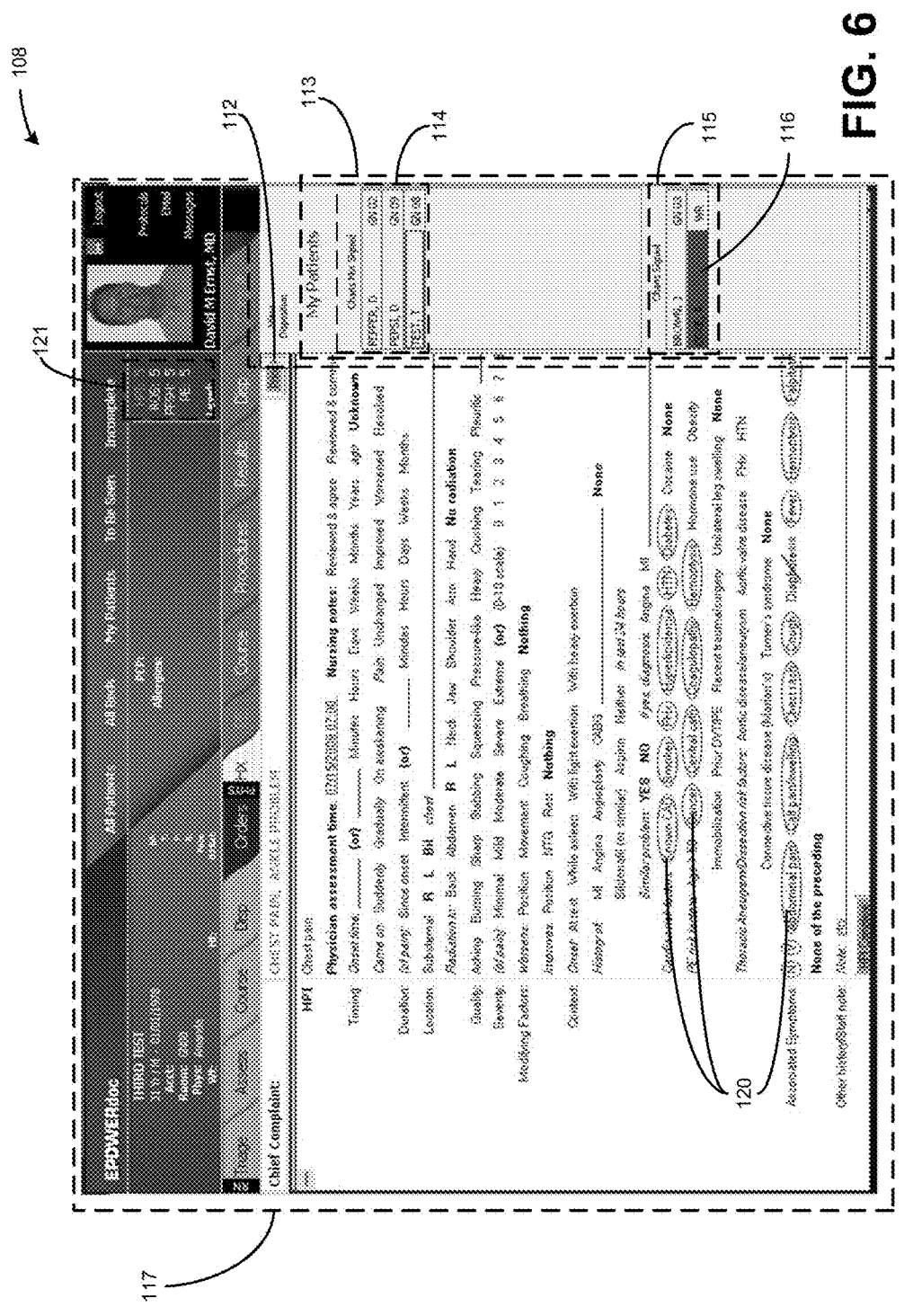

For example, as shown in FIGS. 4-6 and 8-9, each screen of the graphical user interface 108 may include a tab link 112. A user input associated with the tab link 112 (e.g. a mouse or touch screen click on the tab link 112) may cause the graphical user interface 108 to display a slide-out interface 113 as shown in FIGS. 5 and 6.

Figure 7:
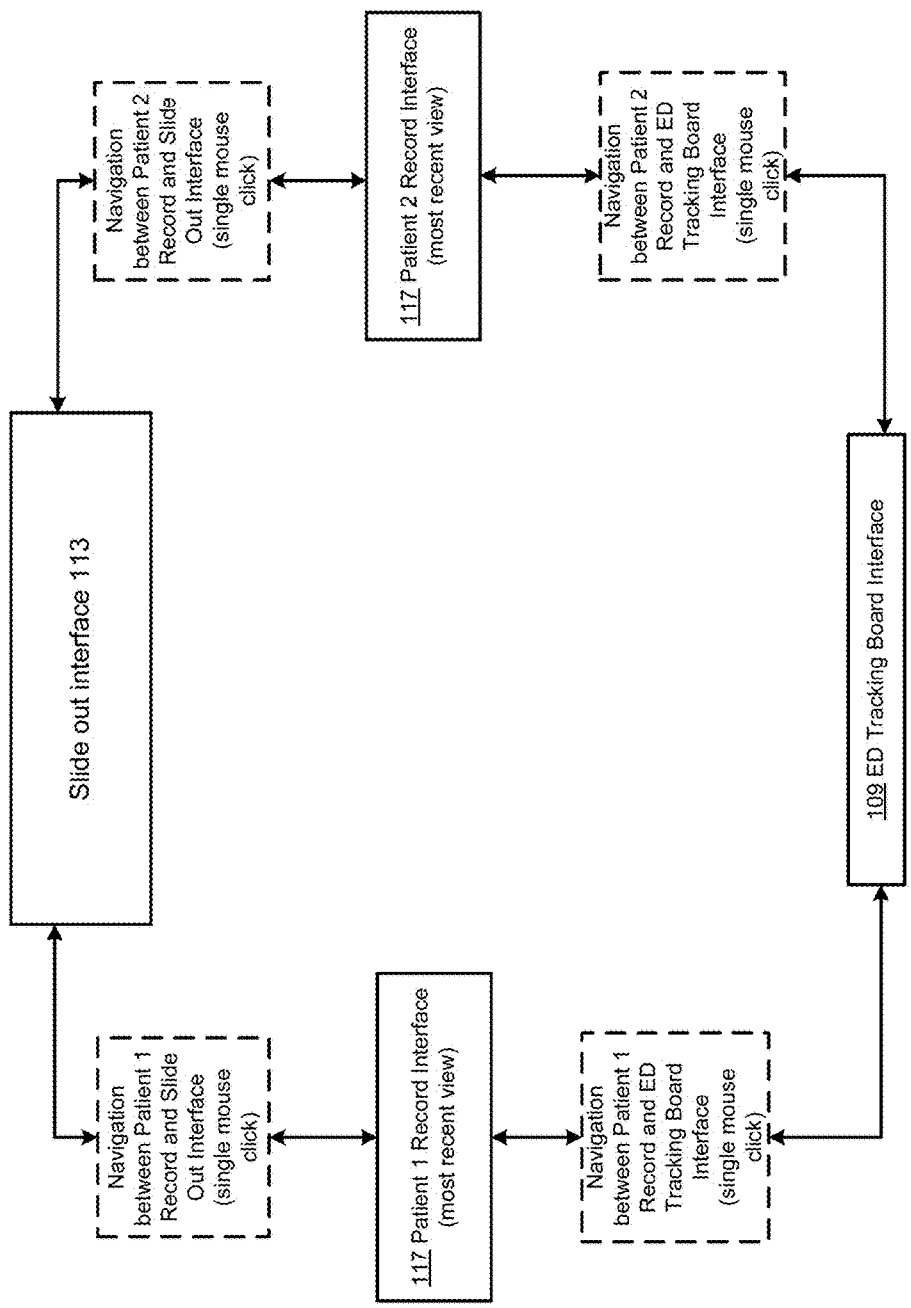
FIG. 7 illustrates a workflow diagram associated with an EDIS.

Referring to FIG. 5, upon receipt of a user input associated with the tab link 112 (e.g. a mouse click, touch screen input, and the like) the slide-out interface 113 may be displayed in an overlaying fashion on top of the tracking board interface 110 providing a view of information for only the patients assigned to the currently logged in user including, but not limited to, patient names and room numbers. The listing of only patients assigned to the current user may serve to avoid the confusion associated with patient record navigation from the tracking board interface 110 which may include fields for all current patients. Further, the slide-out interface 113 may allow the current user to navigate between patient records without having to return to the tracking board interface 110 as shown in FIG. 7.

Physicians and nurses may be required to "sign" patient records upon the completion of care. A second step in the process is "Locking" the record. This is a critical action in the ED workflow process as a patient record cannot be processed or billed without a signature and being locked.

"Locking" a record converts it into a non-modifiable format that can be sent to the Medical Records Department for billing and processing.

Referring again to FIG. 5, the patient list shown on the slide-out interface 113 may be partitioned into a listing of patient records that are active and unsigned 114 and a listing of patient records that are signed 115 or signed and locked 116 (e.g. as indicated by highlighting). If a record has been signed 115 or signed and locked 116, it may move to the lower portion of the slide-out interface 113 and may be highlighted indicating that this record is locked and this workflow is complete. As such, the slide-out interface 113 may show the user, in real time, the workflow status of each patient's records.

Each patient name and room number presented active and unsigned 114 portion of the slide-out interface 113 may be a hyperlink to a patient record interface 117 associated with that patient. A user input associated with those links (e.g. mouse clicking on the link associated with patient "Test") may open a respective patient record interface 117 for that patient (as depicted in FIG. 6).

As shown in FIG. 7, if the user desires to initiate a new task within a patient record, the user may navigate to the patient record interface 117 associated with a patient either via the tracking board interface 110 and/or via the slide-out interface 113.

Figure 8:
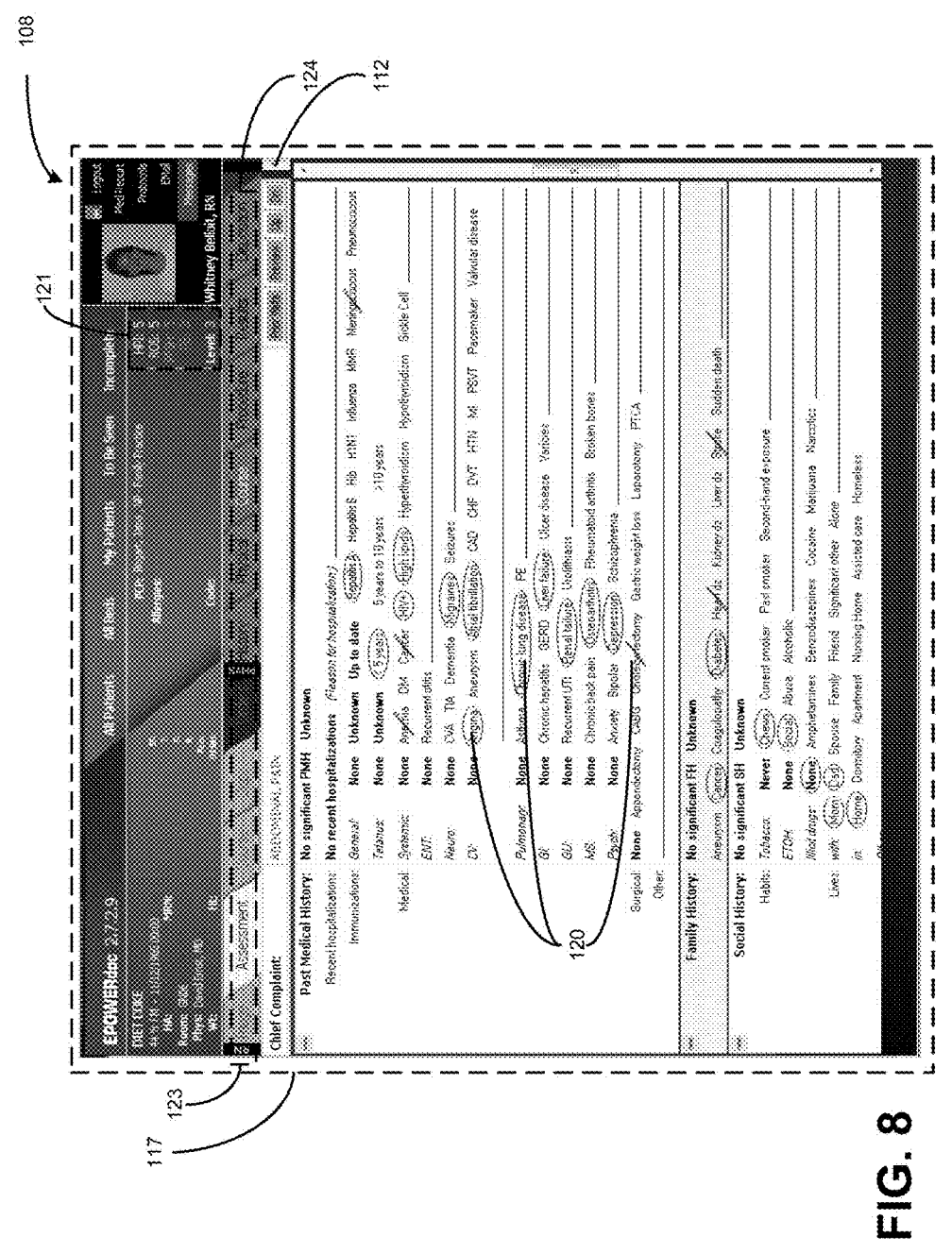

Further, the EDIS 100 may maintain a record of the most recent view of the patient record interface 117 associated with a particular patient and display that same view when the user returns to a particular patient record. For example, when a user navigates away from a current patient record, the EDIS 100 may store data regarding the particular section of the patient record interface 117 that the user was viewing at the time of transition (e.g. as part of or in association with data for that user maintained in the patient records database 104). Upon activation of a link associated with a particular patient within the slide-out interface 113 or from the tracking board interface 110, the graphical user interface 108 may display the patient record interface 117 for the selected patient in the same view as it was when the user previously navigated away from the patient record interface 117 for that patient. For example, where a user was viewing the "Past Medical History" section of a first patient record and navigated to a second patient record, upon returning to the first patient record, the patient record interface 117 will again display the "Past Medical History" section of the first patient record as shown in FIG. 8. Such functionality may serve to eliminate the need for a user to remember where a user was previously working within the record and what activities still remain to be completed for a given patient.

Figure 9:
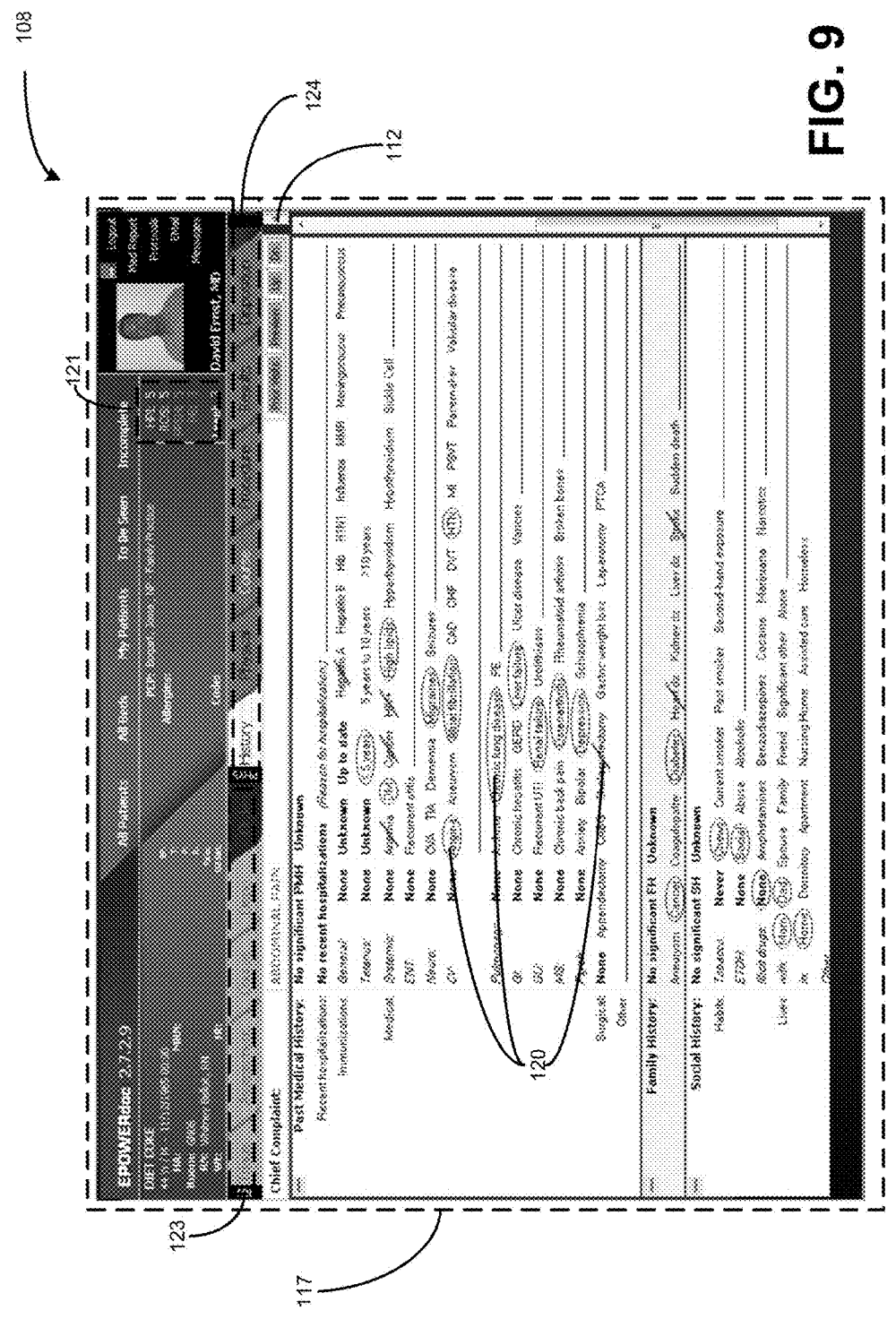

FIGS. 6 and 8-10 depict an exemplary patient record interface 117. Referring again to FIG. 3, a user may select a patient record template 118 stored in a patient record template database 119 within the EDIS server 101 (e.g. though an input in either the tracking board interface 110 or the slide-out interface 113 as described above). A patient record template 118 may be specific to a particular symptom or "Chief Complaint" (e.g. "Abdominal Pain"). A patient record template 118 may be loaded by the processing unit 102 to provide the patient record interface 117. Modifications to the patient record template 118 made by a user in patient record interface 117 may be saved to the patient records database 104 as patient records 105. The patient attributes displayed by the patient record interface 117 according to a patient record template 118 may be customized for the particular attributes of the symptom or known condition in order to provide the user with the proper medical content to document for each "Chief Complaint" for a patient presentation. Upon the selection of a patient record template 118 for a current patient, a user may proceed to selectively activate prompts 120 associated with the symptoms relevant to the patient's previous or present medical status within the patient record interface 117. The prompts 120 are input data fields in the form of medical diagnostic content presented by the patient record interface 117. The prompts 120 may be selected by a user via an input associated with that prompt (e.g. a mouse click or touch screen input associated with text related to a symptom may result in a selection). For example, as shown in FIG. 9, for a patient complaining of abdominal pain, one or more users (e.g. a nurse user as shown in FIG. 8 or a physician user in FIGS. 6 and 9) may individually select prompts 120 for GI-related symptoms such as distension, absence of bowel sounds, tense fluid wave-type palpitations and the like. Each of the prompts 120 may be a three-state data field where the prompt may be set according to presence of the attribute associated with the prompt (e.g. the prompt is circled) an express absence of the attribute associated with the prompt (e.g. a line is drawn through the prompt) or a default condition where no selection is made (e.g. no indicia is associated with the prompt).

The use of such prompts minimizes the need for time consuming free text or voice recognition input of the encounter. Moreover, the patient record interface 117 may forego use of dropdown boxes (e.g. as used in other EDIS) that require inefficient repetitive opening and closing each time to select appropriate prompts.

Referring to FIGS. 6 and 8-10, the patient record interface 117 may include record sections associated with the history of present illness (HPI), review of systems (ROS), past family and social history (PFSH), and physical exam (PE) with each section including various prompts associated with the selected patient record template. The patient record interface 117 may further include an Evaluation and Management counter (E&M counter 121). The Centers for Medicare and Medicaid Services (CMS) and/or third party payers (e.g. insurance companies) may require a patient's medical chart to be coded into one of five Evaluation and Management (E&M) coding levels for physician billing based upon the medical complexity and medical decision making required by the physician to care for that patient. These E&M levels translate into specific billable charges. As such, certain levels of patient documentation are required by the CMS to support the various E&M levels.

Figure 10:
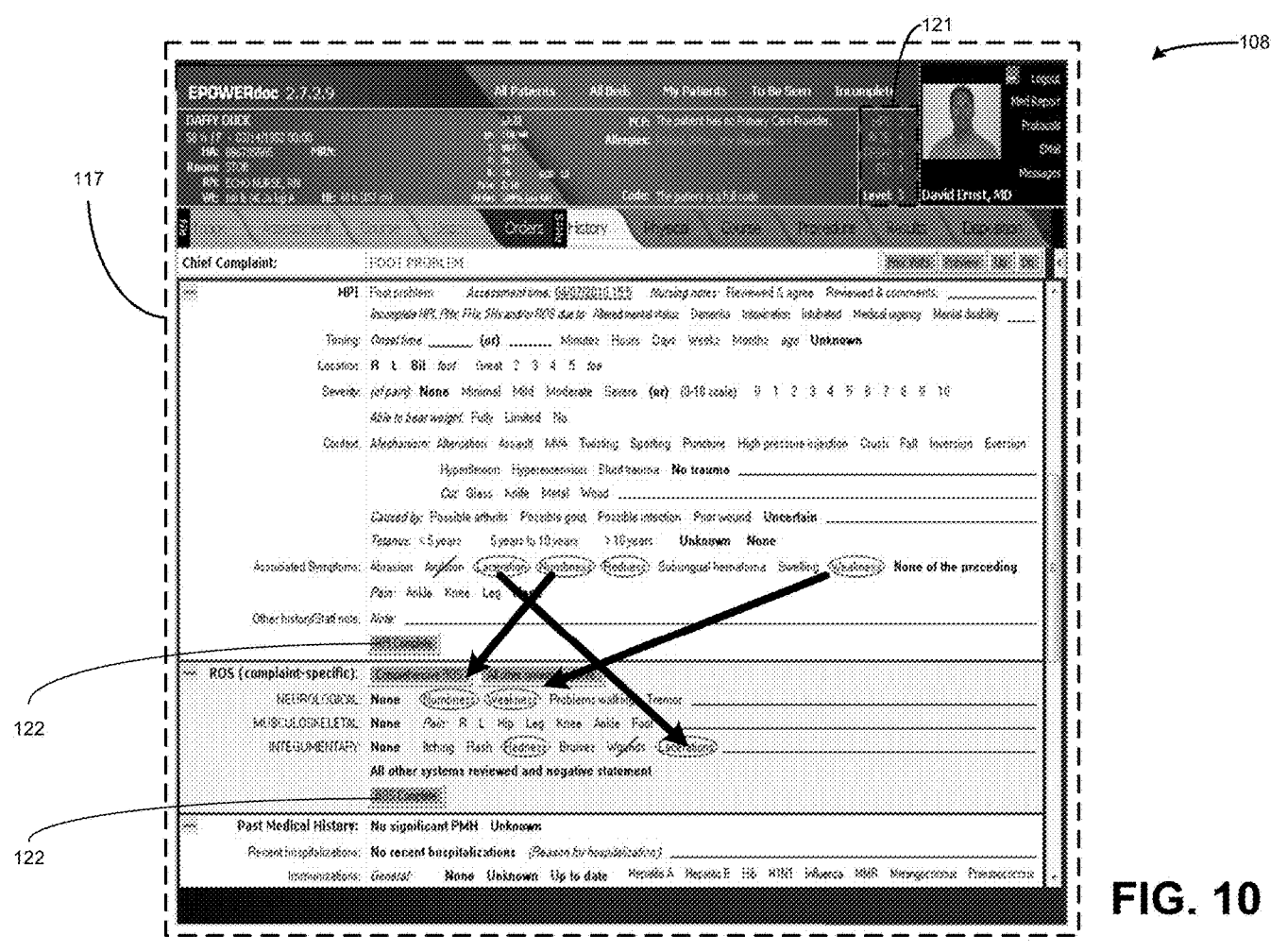

The E&M counter 121 may provide a physician with real time feedback on the degree of documentation that has been completed up to that point during a patient encounter. As a user progressively selects prompts associated with the various sections of the patient record, the EDIS 100 may maintain a record of the amount of documentation that has been completed as shown in FIGS. 6 and 8-10. This amount of documentation completed (e.g. the number and/or type of prompts selected) may be compared to threshold levels of documentation required for a given E&M level. The results of those comparisons may be displayed to the user in the form of the E&M counter 121. For example, the E&M counter 121 may display a number associated with each chart section (e.g. HPI, ROS, PFSH, PE) that indicates that a user has provided sufficient documentation to support a particular E&M level (e.g. level 1-5). Additionally, a change in font color (e.g. from red to white) may occur in a section of the E&M counter 121 when a section has been indicated as completed (e.g. by user selection of a threshold number of prompts 120 or mouse click or touch screen click associated with a section completion icon 122 (e.g. an "HPI Complete" or "ROS Complete" icon as shown in FIG. 10). As such, the E&M counter 121 may eliminate unnecessary searching within a chart to determine what, if any, documentation needs to be completed upon returning to a record.

To facilitate completion of the patent record to a given E&M level, each E&M counter 121 section title (e.g. HPI, PMI, ROS, etc.) may be a hyperlink to the associated section of the patient record interface 117 where a user input associated with an E&M counter 121 section title (e.g. HPI, PMI, ROS, etc.) may allow the user to navigate to the section of the patient record interface 117 associated with that E&M counter 121 section title (e.g. a mouse click on the HPI status indicator of the E&M counter 121 may cause the display of the HPI section of the patient record interface 117).

As described above, a user may selectively activate the prompts 120 associated with the symptoms relevant to a patient's present illness in the various portions of the patient record interface 117. For example, as shown in FIGS. 8 and 9, while the patient record interface 117 may provide physicians and nurses with autonomous sections of the patient record for their documentation (e.g. nurse activity tabs 123 and physician activity tabs 124) there may certain information that may be common to both sections due to its critical nature (e.g. home medications, allergies, pre-hospital care, past medical history, social history, and family history.

Physicians' office workflow-designed EDIS may require a physician and nurse to separately record this information in their respective chart sections, essentially double documenting data common to both of their assessments. HIS modular designed EDIS may extract such common patient information from both records and place it in a common area accessible by both user groups. This approach requires both user groups to leave their respective sections and go to the common area to obtain and/or review this data. This is a time consuming and distracting process that removes critical information from the respective physician and nursing sections of the record.

To facilitate the efficient completion of a patient record 105, the patient record interface 117 may employ prompt forwarding. During this process, multiple prompts within a patient record may be dynamically updated according to a user input associated with only a singe prompt. When prompts are selected in a first patient record interface 117 (e.g. a nursing record interface) that are common to information within a second patient record interface 117 (e.g. a physician's record interface), the selection may be forwarded into the appropriate sections of the second patient record interface 117 (e.g. See FIGS. 8 and 9). For example, selection of a prompt associated with a patient's most recent tetanus shot (e.g. "<5 years") may be forwarded from a nursing patient record interface 117 (See FIG. 8) to the prompt associated with the patient's most recent tetanus shot (e.g. "<5 years") in a physicians patient record interface 117 (See FIG. 9). Such prompt forwarding may be unidirectional (e.g. only from the nurse record to the physician record) or bidirectional (e.g. from the nurse record to the physician record and from the physician record to the nurse record).

Similarly, prompts 120 common to more than one section of a particular user's patient record interface 117 may be forwarded in like manner. For example, as shown in FIG. 10, prompts 120 selected within a physician patient record interface 117, (e.g. prompts 120 the HPI section of the record) may be forwarded to other prompts within other sections of the patient record interface 117 that contain the same information (e.g. the ROS and/or PMSH sections). In a specific example, a patient presenting with a foot problem may be asked questions in the HPI regarding symptoms associated with that problem (e.g. "Laceration," "Numbness," and "Weakness"). If one or more of these prompts were selected within the HPI section, they may be forwarded to the appropriate prompt in the ROS section (e.g. the "Numbness," and "Weakness" prompts in the HPI may be forwarded to the "Neurological" portion of the ROS section while the "Laceration" prompt of the HPI may be forwarded to the "Integumentary" portion of the ROS section). As such, the use of prompt forwarding in the patient record interface 117 may minimize duplicate documentation and the confusion and/or access issues associated with separating the information.

Figure 11:
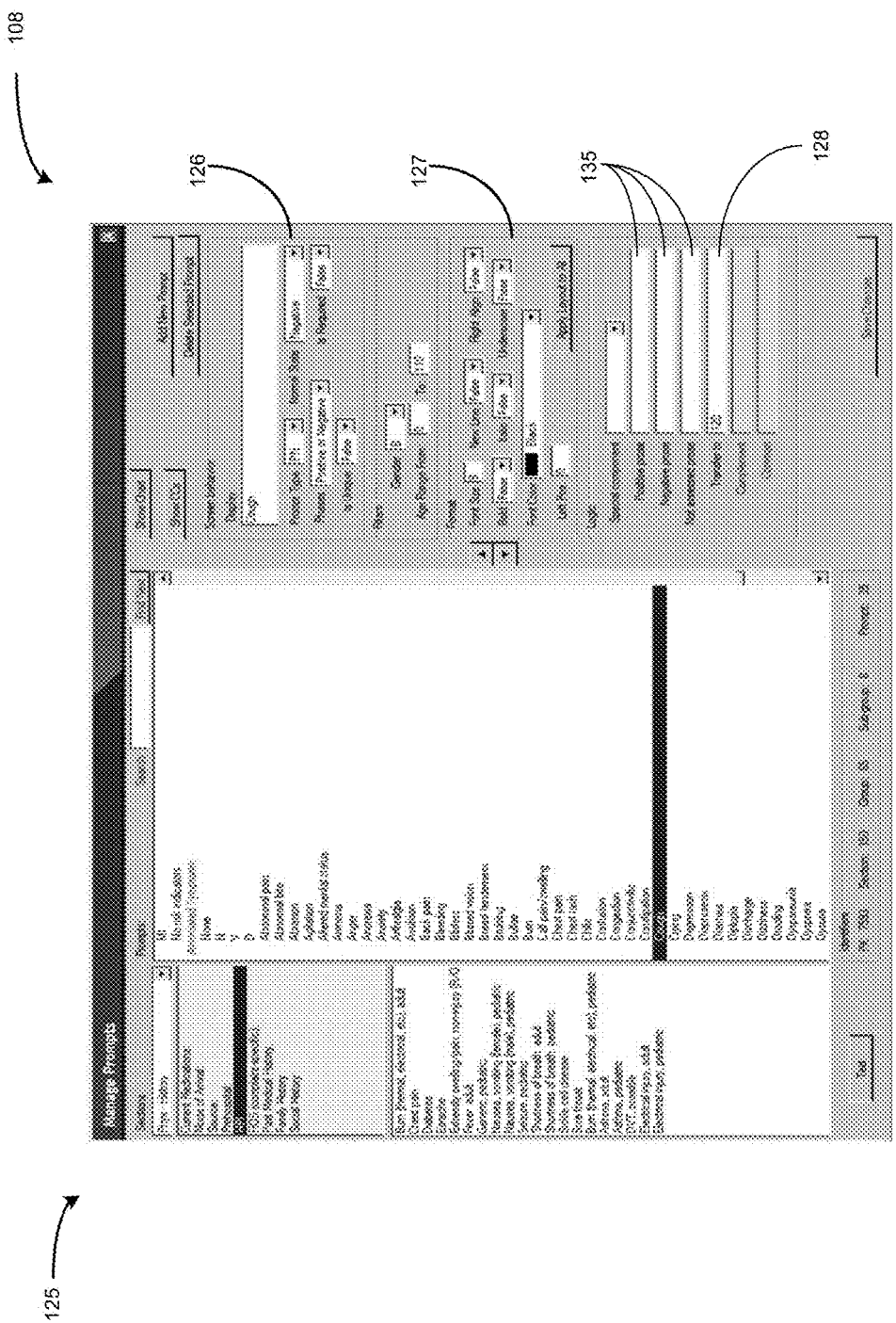
FIG. 11 illustrates a patient record template management interface of an EDIS.

Further, prompt forwarding may be customizable within the EDIS 100. As shown in FIG. 11, the graphical user interface 108 may include a template manager interface 125. As described above, patient record templates stored in a patient record template database 119 may be maintained within the EDIS server 101. The patient record templates may be specific to a particular symptom or known condition (e.g. abdominal pain). For each patient record template, the patient attributes displayed as prompts 120 by the patient record interface 117 may be customized for that particular symptom or condition as well as customized for prompt forwarding location.

The template manager interface 125 may be used to create or modify the patient record templates. For example, as shown in FIG. 11, a user may designate which prompts 120 may be displayed in a the various sections of a patient record interface 117 via template manager interface 125. For example, a user may specify the location and appearance of a prompt 120 in a patient record interface 117 via the "Screen Behavior" field 126 and the "Format" field 127, respectively.

Further, a user may designate a secondary prompt location (e.g. in ROS) associated with a primary prompt location (e.g. in HPI) via the template manager interface 125 thereby allowing for a selection of the primary prompt in the patient record interface 117 to be forwarded to the secondary prompts 120 (e.g. via a "Transfer to" input field 128). Such functionality allows for the customization of the medical templates and their content to suit a facility's specific needs further increasing the specificity and safety of clinical information required during a patient encounter.

Figure 12:
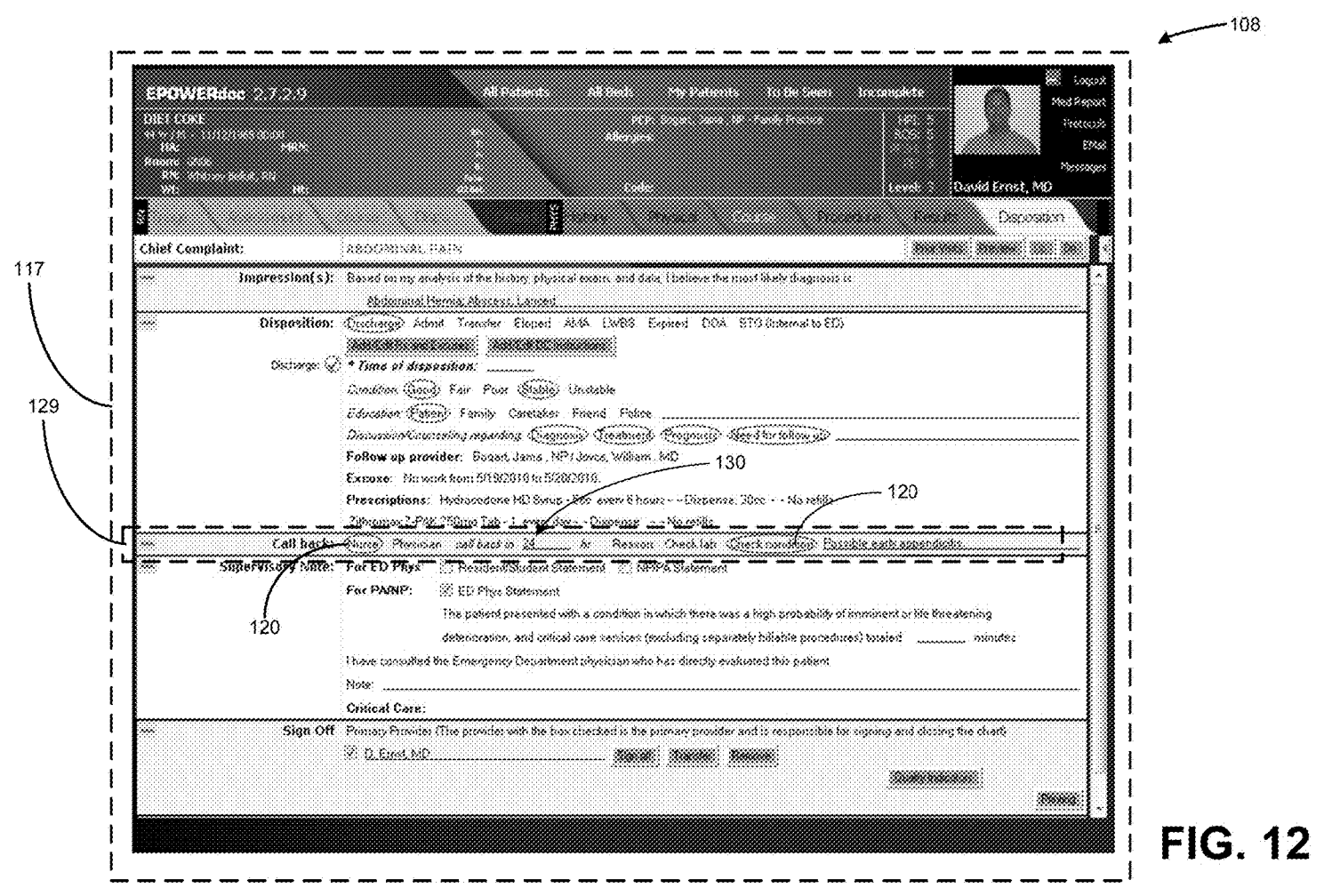

Further, the EDIS 100 may generate reminder messages for clinical staff to call a patient back and check the medical condition at a pre-determined time in the future for a specified reason following discharge. For example, as shown in FIG. 12, an input may be received in the patient record interface 117 selecting one or more callback prompts 120 within a call back section 129, thereby designating a patient record 105 for call-back status. An associated timer may be set during the discharge process (e.g. via entry of a numeric value in a call-back timer data field 130). The patient record 105 may then be flagged as having an associated call back.

Figure 13:
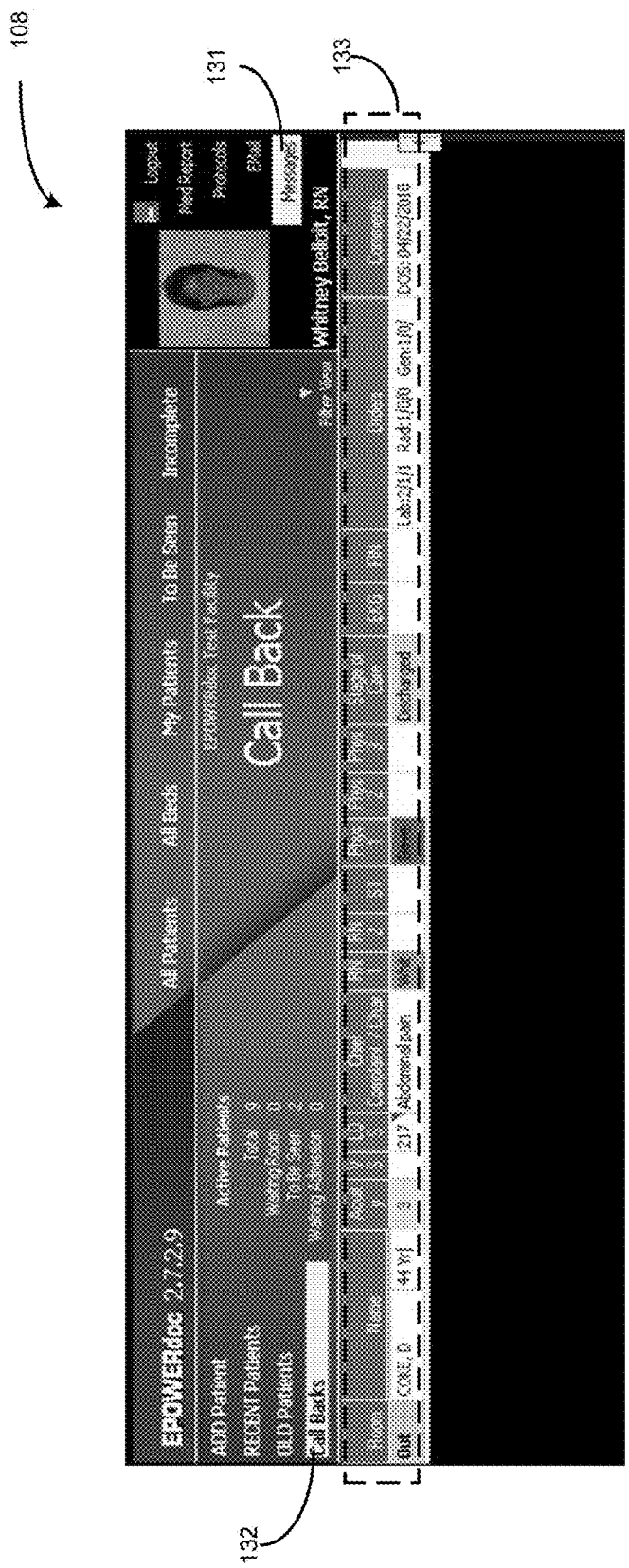
FIG. 13 illustrates a graphical user interface of an EDIS including a call-back interface.

Referring to FIG. 13, when the timer expires, a message indicator 131 may be highlighted in the header of the graphical user interface 108 of the appropriate user. Clicking on the message indicator may cause the display of one or more messages for the user including a notification that a call back timer has expired. The user may then click on a call back link 132 in the header of the graphical user interface 108 to open a call back interface 133 containing any patient records that require a call back. Once the clinician completes a call, they may reopen the appropriate patient record 105 in the patient record interface 117 and document an addendum to the record regarding the conversation. Having the capacity for a reminder to recheck the condition of patients with high risk conditions that have been discharged offers a significant layer of additional patient safety and risk management within the EDIS 100 system.

Frequently there may be more than one user (e.g. one or more physicians and/or one or more nurses) caring for a single patient at the same time in the ED. Traditional EDIS design may only allow one physician or nurse to document on a patient record at a time. This is an obvious efficiency drain that has the potential to impact patient safety. The EDIS 100 may allow for simultaneous multiple nurse and physician users to be documenting on the same patient record at the same time and co-populating each other's record with data in real time.

Upon completion of a patient record 105 following a patient encounter, an EDIS may generate (e.g. display on the user-interface nodes 106 and/or print a paper copy) at least one patient encounter report 134 detailing the patient encounter. In prior EDIS designs (e.g. Physician Office or HIS based EDIS), the creation of computer-generated text in a medical record report is accomplished by providing a pre-configured "fill-in-the-blank"-type report template having only one or two variable words in a sentence which are inserted according to a selection by a user within the EDIS. In such implementations, the reports become "machine like" sentences that may use the same text for multiple patients with similar complaints with the exception of only a few words. Such a report may be difficult for clinicians reading the text to interpret as it may eliminate the ability to "tell the story" about the encounter in an individualized manner. Such rote adherence to a formalized reporting methodology may pose significant malpractice and safety risks as well as increase the likelihood of fraud accusations during a CMS or insurance audit due to the presence of multiple charts with the same presenting complaint appearing nearly identical.

Figure 14:
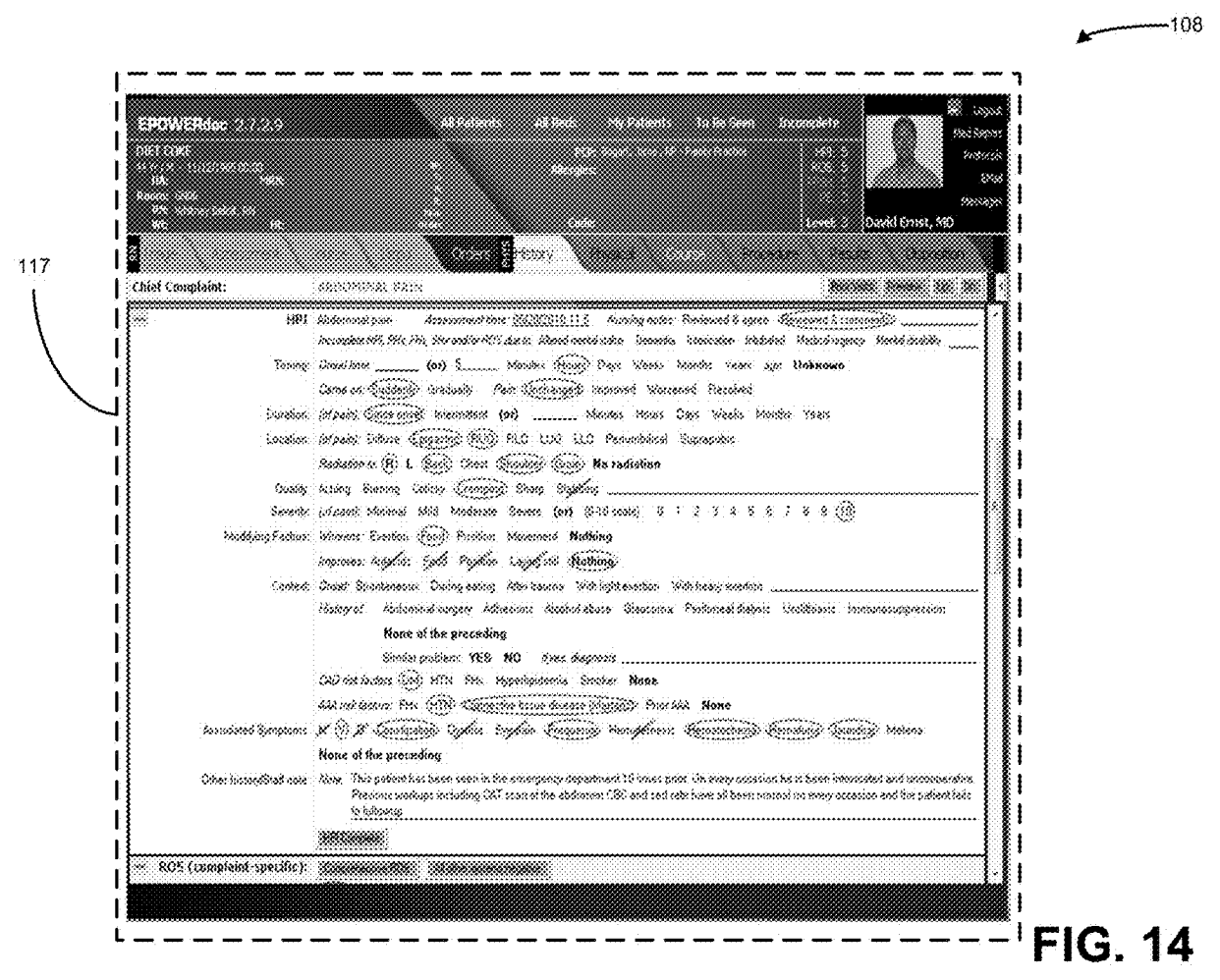
Figure 15:
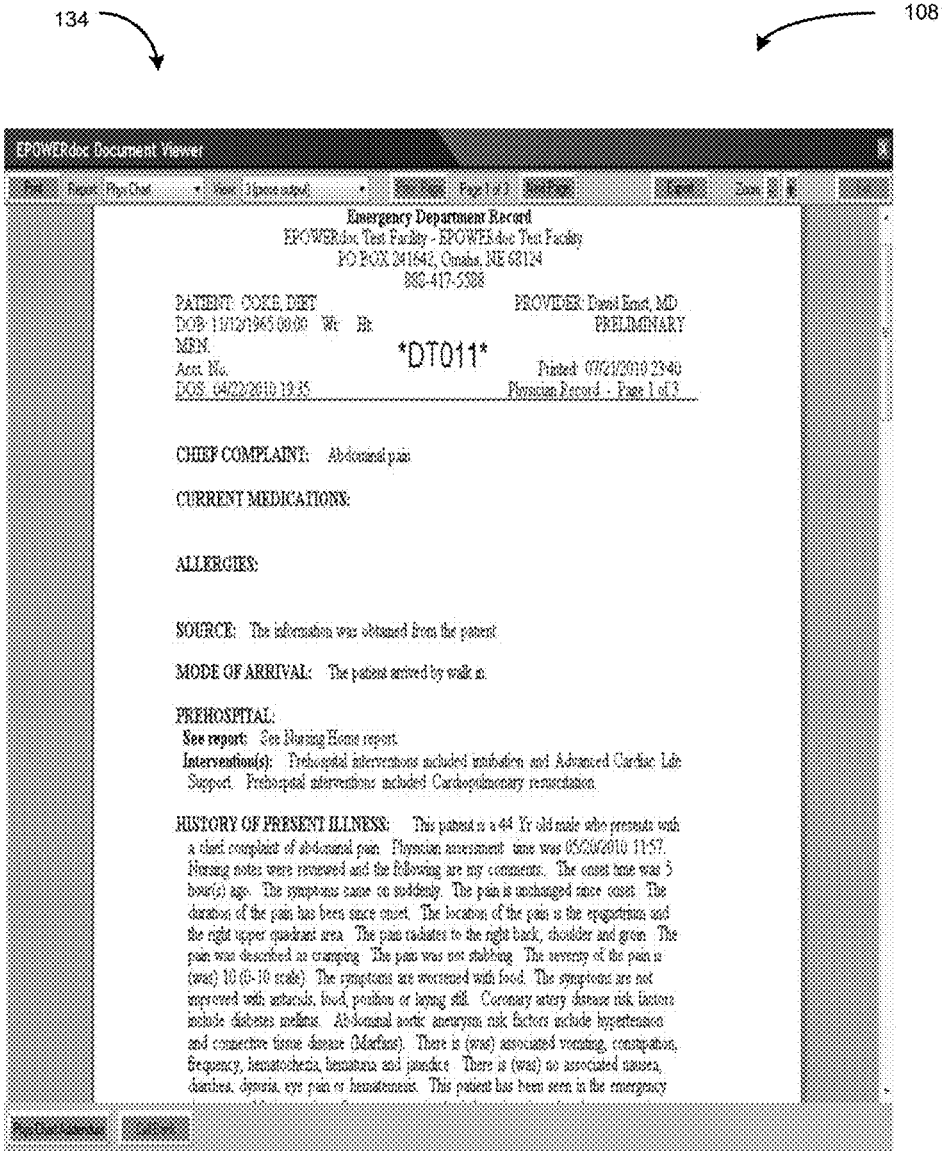
FIG. 15 illustrates a patient encounter report.

In contrast, the processing unit 102 of the EDIS 100 may analyze a patient record 105 maintained in the patient records database 104 and generate a report by applying a series of rules to the patient record 105 according to the prompts 120 which have been selected for that record by a user. For example, in addition to merely tracking the user-selected prompts, a patient record 105 may also contain data reflecting the order in which those prompts were selected, and whether those prompts were positive, negative or neutral. The processing unit 102 may then apply the rules to create a unique sentence structure that is correct in positive or negative context, syntax, and punctuation. For example, as shown in FIG. 14, a user may select various prompts 120 within the HPI section of the patient record interface 117. Following completion of the patient record, the EDIS 100 may generate a patient encounter report 134 as shown in FIG. 15. As can be seen, the text of the HPI section of the patient encounter report 134 tracks the patient record 105 generated from the patient record interface 117 of FIG. 14 incorporating each selected prompt 120 in the order in which it selected and supplementing those selections with plain-language text related to the context of those selections (e.g. positive/negative/neutral language is added according to the state of the selected prompt).

Such a report generation methodology may result in an individualized text document with sentences that are unique to every encounter based on the order and number of prompts selected. The end result is a "story" of the encounter in a text that is nearly identical to what a clinician may dictate. Having an individualized "story" for each encounter may provide a much clearer presentation of patient information and reduce the chances of medical error through misinterpretation and audit risk for fraud.

Referring again to FIG. 11, the plain-language prose for each patient attribute may be customizable within the template manager interface 125 using attribute description fields 135. For example, each attribute may be associated with a particular "positive prose" phrase for a positive determination, a "negative prose" phrase for a negative determination and/or a "not-assessed prose" phrase for an attribute that was not determined which may be incorporated into the patient encounter report 134 according to the prompt 120 selections associated with that attribute.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A patient record management system comprising:
   at least one processor; and
   one or more computer program instructions that, when executed by the processor, program the at least one processor for:
      receiving a login input from a user;
      displaying a first user interface view including:
         a listing of one or more patients assigned to two or more users; and
         a user-activatable interface element;
      responsive to an activation of the user-activatable interface element, displaying a second user interface view including:
         a listing of one or more patient links for only those patients assigned to the logged in user;
      responsive to an activation of a patient link of the one or more patient links:
         retrieving patient attribute data associated with a patient associated with the activated patient link;
         displaying a third user interface view including:
            a patient record interface including one or more user-activatable, multi-state prompt fields indicative of the patient attribute data; and
            the user-activatable interface element;
         detecting a user input activating a first prompt field of the patient record interface to specify a state of the first prompt field;
         displaying the first prompt field in a selected state responsive to the user input activating the first prompt field; and
         displaying a second prompt field distinct from the first prompt field in a selected state responsive to the user input activating the first prompt field.

2. The system of claim 1, wherein the displaying the second user interface includes:
   displaying a first listing of one or more patient links including an indicia of an unsigned patient record; and
   displaying a second listing of one or more patient links including an indicia of a signed patient record.

3. The system of claim 2, wherein the displaying a second listing of one or more patient links including an indicia of a signed patient record comprises:
   displaying a listing of patients including an indicia associated with a signed and locked patient record.

4. The system of claim 3, wherein the displaying a listing of patients including an indicia associated with a signed and locked patient record comprises:
   displaying a visibly highlighted listing of patients including an indicia associated with a signed and locked patient record.

5. The system of claim 1, wherein the displaying the second user interface view includes:
   displaying the second user interface view only partially overlaying the first user interface view responsive to the activation of the interface element when the first user interface view is active.

6. The system of claim 1, wherein the displaying the second user interface view includes:
   displaying the second user interface view only partially overlaying the third user interface view responsive to activation of the user interface element displayed when the third user interface view is active.

7. The system of claim 1, wherein the displaying the third user interface view includes:
   displaying a view of the patient record interface for the patient that is identical to a view of the patient record interface of the patient prior to user navigation away from and back to the third user interface view.

8. A patient record management system comprising:
   at least one processor; and
   one or more computer program instructions that, when executed by the processor, configure the at least one processor for:
      displaying a first user interface view including one or more user-activatable, multi-state prompt fields indicative of patient attribute data;
      detecting a user input activating a first prompt field to specify a state of the first prompt field;
      displaying the first prompt field in the specified state responsive to the user input activating the first prompt field;
      displaying a second user-activatable, multi-state prompt field distinct from the first prompt field in a specified state responsive to the user input activating the first prompt field; and
      updating at least one displayed patient attribute data completion level status indicator indicating a number of prompt fields which have transitioned to a specified state responsive to a user input.

9. The system of claim 8, wherein the patient attribute data completion level status indicator includes:
   an Evaluation and Management (E&M) completion level status indicator for one or more E&M coding categories.

10. The system of claim 9, wherein the E&M completion level status indicator for the one or more E&M coding categories includes:
    a status indicator for at least two of: a history of present illness (HPI) of a patient category, a review of systems (ROS) of a patient, a past family and social history (PFSH) of a patient, and a physical exam (PE) of a patient.

11. The system of claim 8,
    wherein the first prompt field is in a first patient record section; and
    wherein the second prompt field is in a second patient record section distinct from the first patient record section.

12. The system of claim 11, wherein the first patient record section and second patient record section are selected from:
    a section associated with a history of present illness (HPI) of a patient;
    a section associated with a review of systems (ROS) of a patient;
    a section associated with a past family and social history (PFSH) of a patient; and
    a section associated with a physical exam (PE) of a patient section.

13. The system of claim 8,
wherein the first prompt field is associated with a user interface configured for a first user; and
wherein the second prompt field is associated with a user interface configured for a second user distinct from the first user.

14. The system of claim 8, wherein the first prompt field is an at least three-state selectable prompt field.

15. The system of claim 8, wherein the first prompt field is a selectable text prompt field.

* * * * *